United States Patent [19]

Nagaoka et al.

[11] Patent Number: 4,497,560
[45] Date of Patent: Feb. 5, 1985

[54] CONTROL CIRCUIT FOR ACTIVE TYPE RANGE FINDER

[75] Inventors: Shinji Nagaoka; Koji Sato, both of Yotsukaido, Japan

[73] Assignee: Seiko Koki Kabushiki Kaisha, Yotsukaido, Japan

[21] Appl. No.: 456,789

[22] Filed: Jan. 10, 1983

[30] Foreign Application Priority Data

Jan. 11, 1982 [JP] Japan .................................. 57-2618

[51] Int. Cl.³ ............................ G01C 3/08; G03B 3/10
[52] U.S. Cl. ...................................... 354/403; 354/404
[58] Field of Search .............................. 354/403, 404; 250/201 AF

[56] References Cited

U.S. PATENT DOCUMENTS 4,291,223  9/1981  Sakane et al. .................... 354/403 X
4,304,487  12/1981  Odone et al. .................... 354/403 X

*Primary Examiner*—L. T. Hix
*Assistant Examiner*—David M. Gray

*Attorney, Agent, or Firm*—Robert E. Burns; Emmanuel J. Lobato; Bruce L. Adams

[57] ABSTRACT

An active type range finder has a light-emitting element which is pulsatively driven to project light pulses on an object to be photographed. A photodetector element receives the light reflected from the object and produces a photoelectric output signal proportional to the amount of received light. A light-shielding member is scanned over the light-sensitive surface of the photodetector element in correlation with the distance to the object so that the light-shielding member successively shields successive areas of the light-sensitive surface from receiving light. An a.c. amplifier amplifies the photoelectric output signal, and an integrating circuit integrates the amplified photoelectric output signal and produces an integrated d.c. signal having a negative peak value indicative of the position of the scanning light-shielding member which corresponds to the object distance. Detecting circuitry detects the negative peak value and provides a corresponding detection signal indicative of the object distance.

20 Claims, 12 Drawing Figures

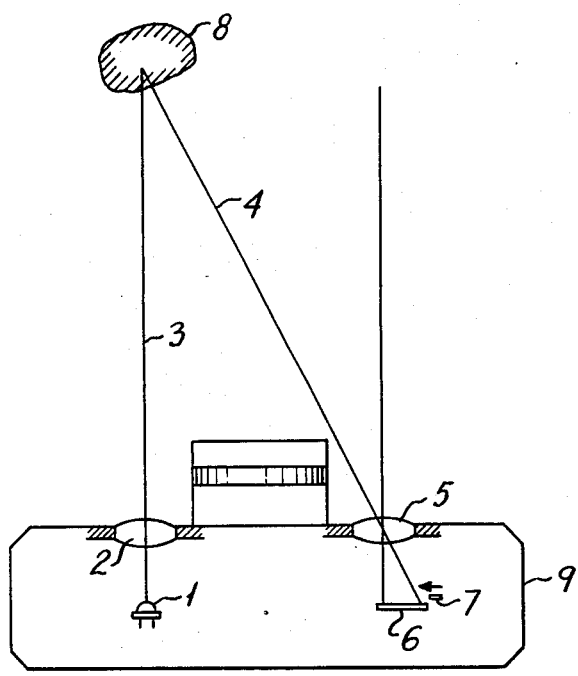
FIG. 1
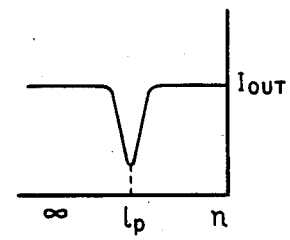
FIG. 2
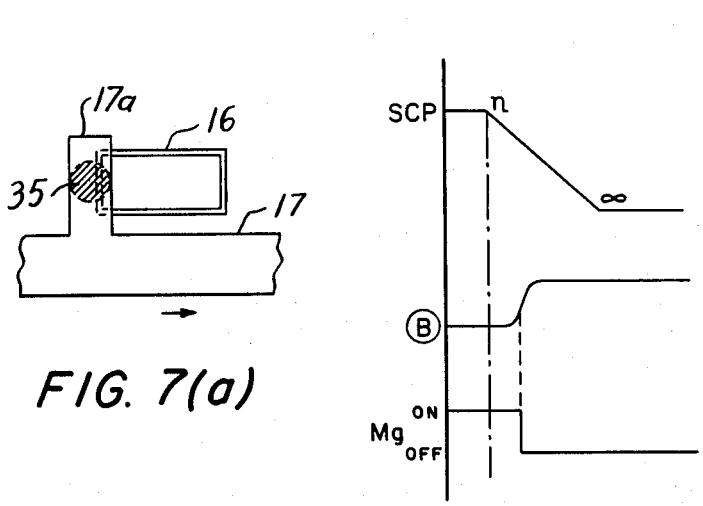
FIG. 7(a)
FIG. 7(c)
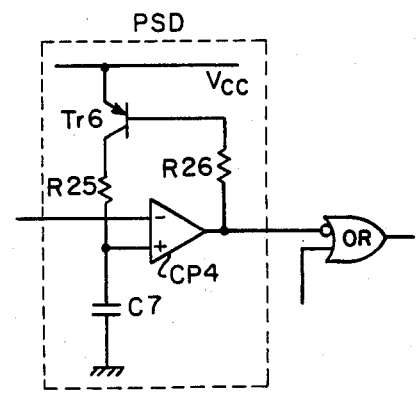
FIG. 7(b)

CONTROL CIRCUIT FOR ACTIVE TYPE RANGE FINDER

BACKGROUND OF THE INVENTION

The present invention relates to a control circuit for a range finder suitable for compact cameras, and more particularly to a circuit for projecting a light beam on an object to be photographed and receiving the light reflected from the object to convert it into an electrical signal, and a control circuit for a device for automatically detecting the object distance by detecting the position of an image of the reflected light by means of mechanical scanning.

Various active type range finders utilizing the principle of triangle distance measurement have been conventionally proposed. For example, in a range finder proposed by the inventors (Japan Patent Application No. 55-124268), a light shielding plate scans over the surface of a single photodetector element and thereby the photoelectric output from a photodetector element is varied. This variation is detected to measure the object distance. Such a range finder will be hereinafter referred to as the light shielding plate scanning type range finder.

The present invention relates to a control circuit, a safety device, a warning system and so on which are particularly suitable for such a light shielding plate scanning type range finder.

In conventional active type range finders, the peak of the reflected light from the object is scanned to be detected, or a photodetector element exhibiting the maximum sensitivity is determined, or two photodetector elements are used with a proper balance. In any case, a very wide dynamic range is required for a control circuit for such range finders. If the minimum object distance is 0.8 m and the maximum object distance is 800 m, a dynamic range in excess of 1,000 is necessary.

Therefore, a special processing circuit means such as a compression circuit must be employed in cameras using a 3 V battery.

SUMMARY OF THE INVENTION

It is an object of the present invention to overcome the disadvantages described above and this object is achieved by a light shielding plate scanning type range finder and a control circuit therefor according to the present invention.

In a control circuit for a light shielding plate scanning type range finder according to the present invention, a negative peak of a photoelectric output produced by the light reflected from the object, that is, a point where the reflected light is shielded and reduced to the lowest level, is detected so that the problem of dynamic range need not be considered. When the reflected light is not shielded, the scanning portion of the light shielding plate causes the output to be dipped to zero level even if the circuit is completely saturated, and this point may be detected. Thus, the dynamic range need not be considered and this provides a marked advantage that the amplification degree of a signal from the photodetector element can be enhanced to a limit defined by a signal to noise ratio and therefore the accuracy of distance measurement at larger distances can be improved.

BRIEF DESCRIPTION OF THE DRAWINGS

FIG. 1 is a diagram for explaining the principle of a light shielding plate scanning type active type range finder;

FIG. 2 shows waveforms of photoelectric outputs obtained in the range finder of FIG. 1;

FIGS. 7(a)–7(c) show an embodiment of a positive slope detecting circuit and diagrams for explaining the mode of operation thereof.

DETAILED DESCRIPTION OF THE INVENTION

Figure 3:
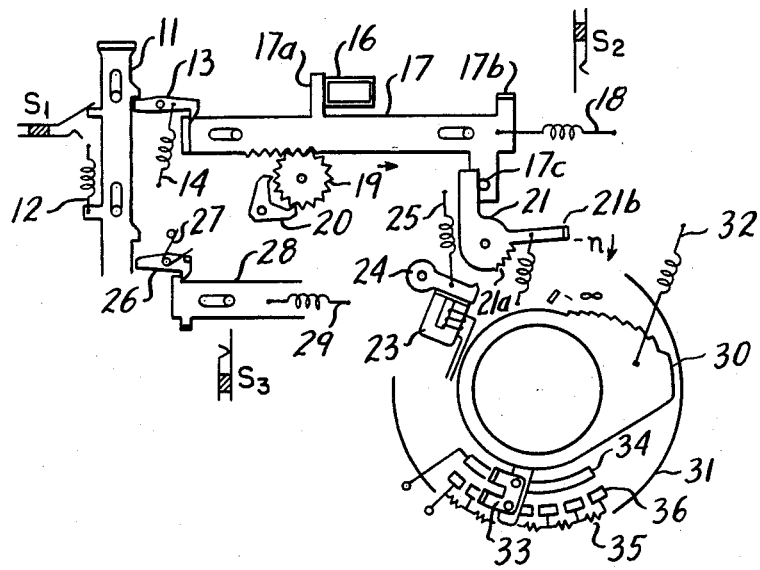
FIG. 3 shows an embodiment of a mechanism constituting a range finder cooperating with a control circuit according to the present invention.

Embodiments of the present invention will be described below with reference to the accompanying drawings.

FIG. 1 is a diagram for explaining the principle of an active type range finder in which a light shielding plate performs scanning. The range finder comprises a light emitting element 1 and a light projecting lens 2. Light is projected along a light axis 3 and reflected from an object 8 to be photographed along another light axis 4. The range finder further comprises a light receiving lens 5, a photodetector element 6 and a light shielding plate 7 for scanning over the surface of the photodetector element. A camera body 9 incorporates the range finder structure. This range finder operates as follows: The light from the light emitting element 1 is focused by the light projecting lens to form a light beam which impinges on the object 8. The light reflected from the object is focused by the light receiving lens 5 on a point on the photodetector element 6 and imaged as a light spot. The light shielding plate 7 scans from right to left as viewed in the drawing in a given correlation with the object distance.

When the light shielding plate 7 moves across the light axis 4, the reflected light from the object is shielded and no longer reaches the photodetector element 6, so that the photoelectric output from the photodetector element 6 is decreased. After the light shielding plate 7 has passed the light axis 4, the output is again increased to the initial level. This is illustrated in FIG. 2 in which a negative peak point $l_p$ indicates the object distance. As the object distance increases, the position of the light spot formed on the photodetector element 6 shown in FIG. 1 is moved to the left.

FIG. 3 illustrates an embodiment of the mechanism of a range finder incorporated in a camera together with a control circuit according to the present invention. In FIG. 3, a release lever 11 is urged upwardly by a spring 12. A scanning plate 17 has a light shielding plate 17a for scanning over the surface of a photodetector element 16. The scanning plate 17 is urged rightward by a spring 18 and locked by a locking member 13 and a spring 14. A gear 19 and an anchor 20 control the running speed of the scanning plate. A control lever 21 is made to rotate clockwise by a spring 22 and is engaged with a pin 17c provided on the scanning plate 17 to rotate therewith. A spring 25 serves to separate an iron piece 24 from an electromagnet 23. A locking member 26 locks a shutter actuating lever 28 and a spring 29 urges the shutter actuating lever 28 rightward. A stepped cam 30 serves to determine the amount of forward movement of an objective lens and is adapted to rotate counterclockwise by means of a spring 32. A contact piece 33 selects the value of a resistor 36 in accordance with the amount of forward movement of the objective lens, which value is used as distance information for a Flashmatic Mode.

Figure 4:
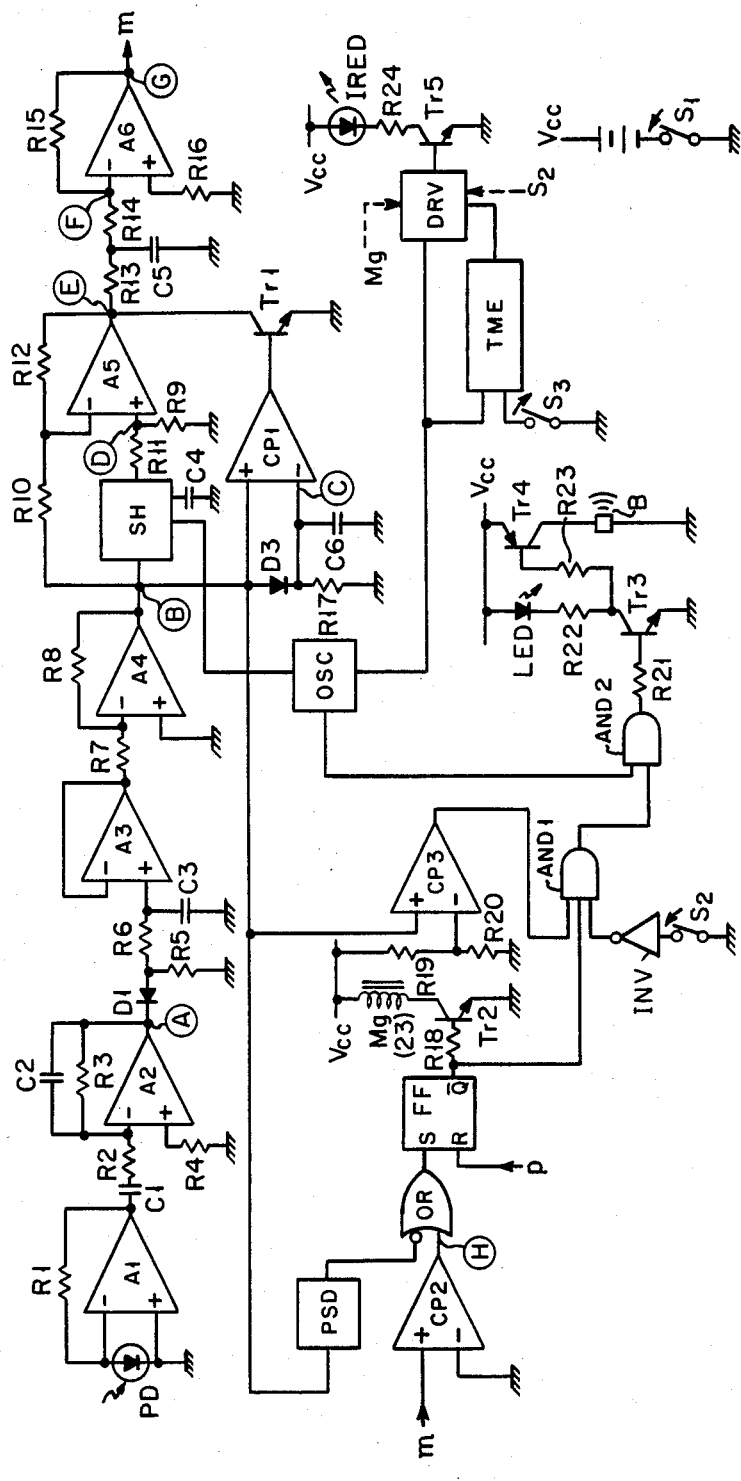
FIG. 4 shows an embodiment of a control circuit for a range finder according to the present invention.

FIG. 4 illustrates an embodiment of a control circuit for a range finder according to the present invention. In FIG. 4, a photodetector element PD converts a short-circuit current into a voltage through a first stage amplifier A1. The circuit comprises a feedback resistor R1, a capacitor C1 for coupling an alternating current and a second stage amplifier A2 for alternating current amplification. The control circuit further includes a feedback capacitor C2 and a resistor R3, as well as a detecting diode D1, an integrating resistor R6, an integrating capacitor C3 and a discharging resistor R5. Furthermore, a voltage follower A3, a direct current amplifier A4 for an integrated output, an input resistor R7 and a feedback resistor R8 are provided. The circuit also comprises a sample and hold circuit SH, a differential amplifier A5 and input resistors R10 and R11. A comparator CP1 receives the integrated output at its non-inverting input. A capacitor C6 and a resistor R17 are connected to the inverting input of the comparator CP1 and a diode D3 is connected between the non-inverting and inverting inputs of the comparator to form a clamp circuit. The output of the comparator CP1 is connected to a transistor Tr1. A resistor R13 and a capacitor C5 constitute a second integrating circuit. An inverting amplifier A6 is connected at its output to the non-inverting input of a comparator CP2. The output from a positive slope detecting circuit PSD and the output from the comparator CP2 are supplied to an OR gate OR. The positive slope detecting circuit is further connected to a flip-flop FF. A transistor Tr2 controls an electromagnet Mg used for distance measurement. A comparator CP3 is connected at its non-inverting input to receive the first integrated output and at its inverting input to a bleeder consisting of resistors R19 and R20. There are further provided AND gates AND1 and AND2 as well as an invertor INV. A switch S2 is turned on when the scanning plate has substantially completed the scanning motion. A transistor Tr3 controls a light emitting diode LED for providing a warning signal and another transistor Tr4 controls an electronic buzzer B. An oscillator OSC and a timer circuit TME are triggered by a release switch S3 of a camera shutter to control the operation of a driving circuit DRV for driving an infrared-ray emitting diode IRED which emits infrared-rays and is pulsatively driven by a transistor Tr5. A power supply switch S1 is further provided.

Figure 5:
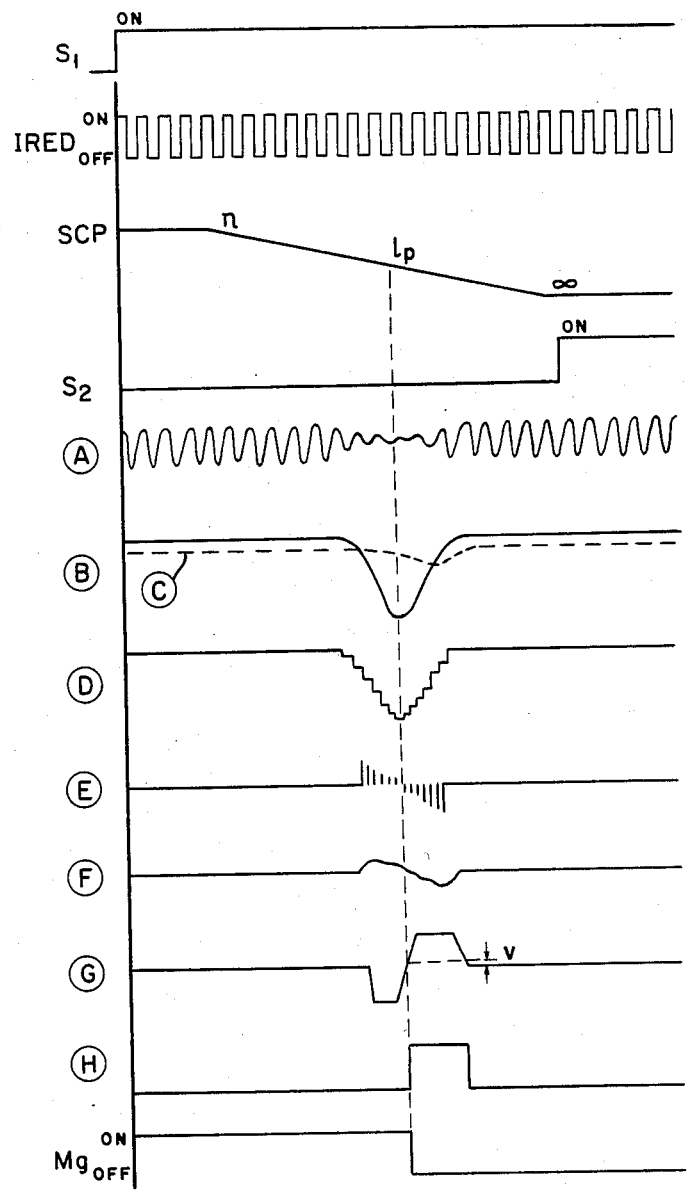
FIG. 5 shows output waveforms obtained from the respective circuit components for explaining the mode of operation of the control circuit of FIG. 4 according to the present invention.

The mode of operation of the range finder shown in FIG. 3 and the control circuit shown in FIG. 4 will be described below. Waveforms obtained in operation of the respective circuit components are illustrated in FIG. 5.

When the release lever 11 is depressed, the power supply switch S1 is turned on to supply power to the respective circuit components. The light receiving circuit is then rendered operative and the infrared-ray emitting diode IRED is pulsatively driven at a constant period by the driving circuit DRV to project light pulses toward the object.

When the release lever 11 is further depressed, the scanning plate 17 is disengaged from the locking member 13 and then starts running by means of governors 19 and 20 at a constant speed in the direction indicated by arrow in the drawing. In FIG. 5, SCP denotes the operation of the scanning plate 17 and n denotes the smallest object distance. After the light shielding plate 17a starts scanning over the photodetector element 16 to shield the light spot formed thereon, the waveform of an output A from the AC amplifier A2 varies in amplitude as shown in FIG. 5. This AC signal is detected by the diode D1, and then integrated by the resistor R6 and the capacitor C3. The waveform obtained after amplification by the amplifier A4 is a dipped waveform having a negative peak as shown by B of FIG. 5. The waveform from the sample and hold circuit SH is stepped as shown by D of FIG. 5. The waveforms B and D are input to the differential amplifier A5 to obtain an output waveform E. The clamp circuit consists of the comparator CP1, the diode D3, the capacitor C6 and the resistor R17, and the waveform appearing at the inverting input of the comparator CP1 is delayed at its trailing edge relative to the dipped waveform B as illustrated by C of FIG. 5. When the waveform B is equal to or greather than the waveform C, the transistor Tr1 is turned on to clamp the output of the differential amplifier A5. This hinders a slight variation of the integrated output waveform B caused by disturbance or the like when the light spot is not shielded by the light shielding plate 17a, which in turn prevents erroneous operation. The output waveform E is integrated by the resistor R13 and the capacitor C5, and then amplified by the inverting amplifier A6 to obtain an output waveform G. The output of the inverting amplifier A6 is connected to the non-inverting input of the comparator CP2 and the inverting input of this comparator CP2 is at a Gnd level. If the non-inverting input is increased from the Gnd level and exceeds a level v of the offset voltages of the non-inverting and inverting inputs, the output is inverted, which is shown by a waveform H. The OR gate OR receives the output from the comparator CP2 and the output from the positive slope detecting circuit PSD as described below. When the output from the comparator CP2 is inverted, the next stage flip-flop FF is set through the OR gate OR and the output $\bar{Q}$ is inverted to turn off the transistor Tr2. As a consequence, the electromagnet Mg is cut off. In particular, the scanning motion of the light shielding plate 17a over the photodetector element 16 causes the integrated output to the dipped as shown by the waveform B and the electromagnet Mg is cut off at the peak negative point. When the electromagnet Mg is cut off, the position of the scanning plate 17 corresponds to the object distance. The control lever 21 shown in FIG. 3 starts rotating clockwise in synchronism with the motion of the scanning plate 17. The hook of the iron piece 24 is engaged with a ratchet portion 21a of the control lever 21 to stop the rotation of the control lever 21 when the electromagnet Mg (23) is cut off. When the release lever 11 is still further depressed, the shutter actuating member 28 is disengaged from the locking lever 26 and starts running and a mechanism (not shown) causes first the stepped cam 30 to rotate counterclockwise. The angle of rotation of the stepped cam is controlled by a stepped cam stopper portion 21b of the control lever 21, so that the amount of forward movement of the objective lens to the in-focus position is automatically determined. Thereafter, the shutter is opened and closed. The contact piece 33 is also rotated as the objective lens is moved to select a resistance value corresponding to the object distance. The value is used as information for the Flashmatic Mode or an operatively coupled warning system. The switch S2 is turned on when the scanning plate has completed the scanning motion from a point corresponding to the minimum object distance up to a point corresponding to the maximum object distance. The switch S2 produces a timing signal for the cooperating warning system or a signal for turning off the infrared-ray emitting diode IRED. The switch S3 is turned on by the operation of the shutter actuating member 28 and produces a trigger signal for the timer circuit TME. The timer circuit TME is provided for holding the infrared-ray emitting diode IRED in the ON state until the distance is measured, even if the release lever 11 is depressed too early. In this case, the switch S2 does not serve to turn off the diode IRED. The infrared-ray emitting diode IRED may be turned off when the electromagnet Mg is cut off.

Figure 6:
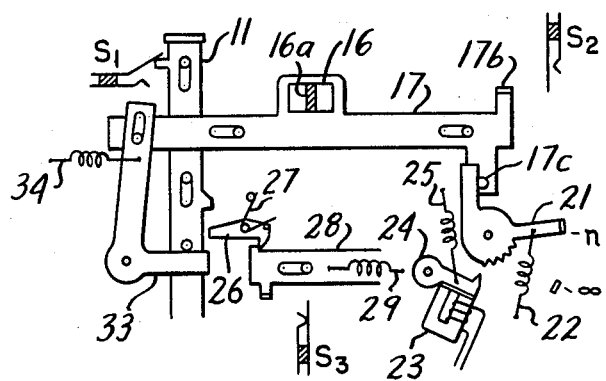
FIG. 6 shows another embodiment of a range finder mechanism.

A mechanism shown in FIG. 6 and a warning circuit will be now described below. In FIG. 6, elements functioning in the same manner as in FIG. 3 are respectively indicated by the same reference numerals. In this embodiment, the photodetector element 16 is mounted on the scanning plate 17 and has at its center a non-sensitive zone 16a. As the scanning plate 17 scans over the photodetector element, the photoelectric output varies in a manner identical to that in the embodiment shown in FIG. 3 and therefore can be controlled by the circuit shown in FIG. 4. In addition, a lever 33 constantly serving to return the release lever is arranged together with a spring 34. When the release lever 11 is released, the release lever 11 and the scanning plate 17 are always returned to the initial states, respectively. In this mechanism, the scanning plate 17 moves following the depressed release lever 11. The electromagnet Mg is cut off at the negative peak of a dipped integrated output waveform as in the embodiment described above, to determine the phase of the control lever 21. The comparator CP3 shown in FIG. 4 receives at its non-inverting input a first integrated output and at its inverting input voltage divided in the bleeder resistors R19 and R20. The AND gate AND1 receives the output from the comparator CP3, the output from the flip-flop FF and the inverting signal from the switch S2. In particular, when the scanning plate 17 has completed its scanning motion to turn on the switch S2, a signal for turning off the electromagnet Mg is not yet obtained and when the first integrated output is at a sufficiently high level, the AND gate AND1 is turned off and the next AND gate AND2 renders conductive the transistors Tr3 and Tr4 constituting the driving circuit in accordance with the output from the oscillator OSC. Flashing of the light emitting diode LED or intermittent acoustic signals from the electronic buzzer B indicate that the range finder has not operated properly or that the object is too close to the camera. Then, a photographer may remove his finger from the release lever 11 and reoperate the range finder. At this time, the iron piece 24 of the electromagnet 23 is reset by a known means (not shown).

The positive slope detecting circuit will be described below with reference to FIG. 7. As illustrated in FIG. 7(a), it is assumed that the photodetector element 16, the light shielding plate 17a and a light spot 35 are respectively slightly displaced from their ideal positions. This may be caused by erroneous mounting in the manufacturing process or the like. As shown by a waveform B in FIG. 7(c), the integrated output is not dipped and is in the form of a monotonously increasing signal when the scanning plate 17 (SCP) moves. Also in this case, the circuit for turning off the electromagnet Mg may comprise, for example, a circuit as illustrated in FIG. 7(b). A capacitor C7 is connected to the non-inverting input of a comparator CP4, a charging resistor R25 and a switching transistor Tr6 are arranged to be operated by the output from the comparator CP4 and the first integrated output is applied to the inverting input of the comparator. The first integrated output begins to be increased by means of this circuit to supply a signal for actuating the next stage OR gate OR, so that the electromagnet Mg can be turned off. Since the output obtained by detecting the negative peak of the dipped waveform is also applied to the OR gate OR, the OR gate OR is normally turned off at the earlier one of the timing of the output from the comparator CP2 shown in FIG. 4 and the timing of the output from the positive slope detecting circuit PSD to actuate the flip-flop FF.

Figure 8A:
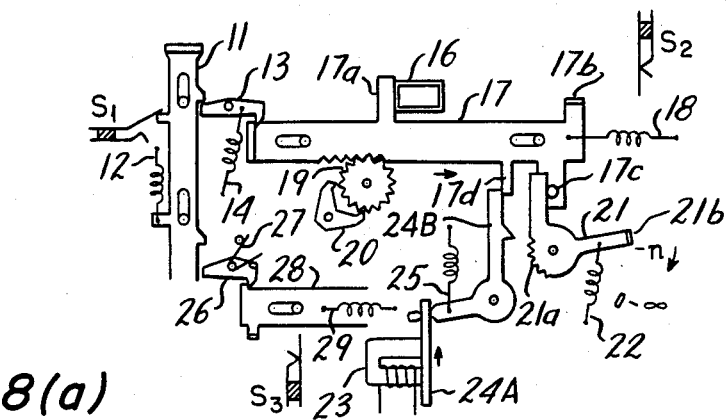
FIGS. 8(a)–8(c) show another embodiment of an electromagnet control circuit and a mechanism therefor, and a diagram for explaining the mode of operation thereof.
Figure 8B:
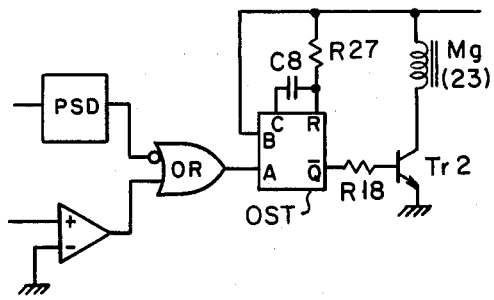
Figure 8C:
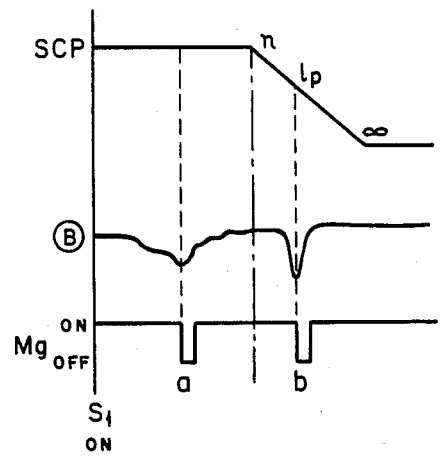

FIG. 8 shows another embodiment of a mechanism and control circuit for controlling the electromagnet Mg. As shown in FIG. 8(c), if the intensity of the light reflected from the object varies for some reason as illustrated by a waveform B before the scanning plate SCP starts scanning, the electromagnet Mg is turned off at a point a in a conventional manner, which may cause erroneous distance measurement, but is rapidly reenergized and then again turned off at the negative peak of the proper dipped signal, that is, at a point b, whereby accurate distance measurement is ensured. In FIG. 8(a), an iron piece 24A of the electromagnet 23 is operated to slide and prevents the operation of a lock lever 24B by means of a locking portion 17a until the scanning plate 17 starts scanning. Therefore, after the scanning plate 17 starts scanning, the ratchet of the control lever 21 can be locked by the lock lever 24B. The control circuit is provided at the stage next to the OR gate OR with a one-shot multivibrator OST.

The interval during which the electromagnet 23 is kept off is determined by the values of a capacitor C8 and a resistor R27.

The measured distance can be readily displayed by providing a display member which operates correspondingly to the angle of rotation of the control lever 21. In principle, the stopper portion 21b for the stepped cam may be seen through the finder.

Furthermore, the display member may comprise a member cooperating with the scanning plate 17, provided that the scanning motion of the scanning plate 17 is stopped by turning off the electromagnet 23.

In summary, in accordance with the present invention, an active type range finder in which a light shielding plate performs scanning (including the type in which a photodetector element having a non-sensitive zone is scanned) comprises a circuit for detecting the minimum point of a dipped photoelectric output using an AC amplifier, a detecting circuit, an integrating circuit, a sample and hold circuit, a differential amplifier, a valtage comparator, a flip-flop, etc. With this circuit arrangement, the negative peak of the dipped output can be precisely and accurately detected. In addition, in the normal state in which the photoelectric output is not dipped, the input becomes too high, so that the accuracy of distance measurement is not influenced by the saturated condition of the amplifier circuit. Consequently, the amplification degree can be made as high as possible and the accuracy of distance measurement at large distances can be significantly improved.

The clamp circuit for preventing erroneous operation which may be otherwise caused by disturbance in the normal state of the photoelectric output, or the positive slope detecting circuit used when the dipped waveform is not produced due to erroneously mounted photodetector element and light shielding plate, as well as various safety devices such as a means for suppressing a signal which is produced due to abrupt change of the object conditions after the power supply is turned on, but before the scanning plate starts scanning, by pulsatively turning on and off the electromagnet (reenergizing system) ensure more reliable distance measurement. Furthermore, if a distance measurement signal is not produced even at a sufficient input level, a warning signal indicating that distance measurement must be made once more can be produced by a light emitting diode or an electronic buzzer, which is extremely effective in practical use.

What is claimed is:

1. In a range finder of the active type in which light projecting means comprised of a light emitting element and a light projecting lens projects light on an object to be photographed and the light reflected from the object is detected and processed to detect the object distance, a control circuit for an active type range finder comprising: a photodetector element disposed to receive the light reflected from the object and produce a photoelectric output signal proportional to the amount of received light, a light shielding member for scanning over the surface of the photodetector element in correlation with the object distance to successively shield successive regions of the photodetector element surface from receiving light, a driving circuit for pulsatively driving said light emitting element, an alternating current amplifier circuit for amplifying the photoelectric output signal from said photodetector element, a detecting circuit and an integrating circuit for converting the variation of the amplified photoelectric output signal into an integrated direct current signal having a negative peak value corresponding to the position of the scanning light shielding member which corresponds to the object distance, a peak detecting circuit for detecting the negative peak value of the direct current signal, and an electromagnet control circuit responsive to the detection of the negative peak value for controlling the focussing of an objective lens.

2. A control circuit for an active type range finder according to claim 1, further comprising a clamp circuit for passing an output to a next stage only when the integrated direct current signal abruptly varies by at least a constant predetermined value.

3. A control circuit for an active type range finder according to claim 1, wherein said peak detecting circuit comprises a sample and hold circuit, a differential amplifier, an integrating circuit, and a voltage comparator.

4. A control circuit for an active type range finder according to claim 1, wherein said electromagnet control circuit comprises a flip-flop and an OR gate connected to a set input of said flip-flop, said OR gate receiving an output from a positive slope detecting circuit and an output from said peak detecting circuit.

5. A control circuit for an active type range finder according to claim 1, wherein said electromagnet control circuit includes a one-shot multivibrator.

6. A control circuit for an active type range finder according to claim 1, further comprising a warning circuit having a light emitting diode and an electronic buzzer, said warning circuit being driven through an AND circuit by a scan end signal indicating that a scanning motion for distance measurement is completed, an electromagnet control signal from said electromagnet control circuit and an output from said detecting circuit, and said warning circuit receiving a signal modulated by a pulse oscillator output.

7. A device for detecting the distance between an object and the device comprising: light-projecting means for projecting light pulses on an object whose distance is to be detected; light-receiving means including a light-sensitive surface for receiving light including projected light reflected from the object and producing a photoelectric output signal proportional to the amount of light being received by the light-sensitive surface; scanning means including a light-shielding member for scanning the light-shielding member over the light-sensitive surface in correlation with the distance to the object so that the light-shielding member successively shields successive areas of the light-sensitive surface from receiving light; circuit means receptive of the photoelectric output signal for developing therefrom an integrated d.c. signal having a negative peak value indicative of the position of the scanning light-shielding member which corresponds to the object distance; and detecting means for detecting the negative peak value of the integrated d.c. signal and producing a corresponding detection output signal indicative of the position of the scanning light-shielding member which corresponds to the object distance.

8. A device according to claim 7; wherein the circuit means comprises an a.c. amplifier for amplifying the photoelectric output signal, and integrating circuit means for integrating the amplified photoelectric output signal and producing an integrated d.c. signal having a negative peak value indicative of the position of the scanning light-shielding member which corresponds to the object distance.

9. A device according to claim 8; wherein the circuit means includes a d.c. amplifier for amplifying the integrated d.c. signal.

10. A device according to claim 8; wherein the detecting means comprises a peak detecting circuit for detecting the negative peak value of the integrated d.c. signal.

11. A device according to claim 8; further comprising a movable control member movable in synchronism with the scanning movement of the light-shielding member such that the position of the control member corresponds to the object distance; and electromagnet control circuit means responsive to the detection output signal for arresting the movement of the control member during the course of the scanning movement of the light-shielding member so that the arrested position of the control member corresponds to the object distance.

12. A device according to claim 7; further comprising a movable control member movable in synchronism with the scanning movement of the light-shielding member such that the position of the control member corresponds to the object distance; and electromagnet control circuit means responsive to the detection output signal for arresting the movement of the control member during the course of the scanning movement of the light-shielding member so that the arrested position of the control member corresponds to the object distance.

13. A device according to claim 7; wherein the detecting means comprises a peak detecting circuit for detecting the negative peak value of the integrated d.c. signal.

14. A device for detecting the distance between an object and the device comprising: light-projecting means for projecting light pulses on an object whose distance is to be detected; light-receiving means including an elongate light-sensitive surface having at its center portion a non-light-sensitive zone for receiving light including projected light reflected from the object and producing a photoelectric output signal proportional to the amount of light being received by the light-sensitive surface; scanning means for effecting scanning movement of the light-sensitive surface in correlation with the distance to the object so that the non-light-sensitive zone successively moves across the path of light received by the light-receiving means; circuit means receptive of the photoelectric output signal for developing therefrom an integrated d.c. signal having a negative peak value indicative of the position of the scanning light-shielding member which corresponds the object distance; and detecting means for detecting the negative peak value of the integrated d.c. signal and producing a corresponding detection output signal indicative of the position of the scanning light-shielding member which corresponds to the object distance.

15. A device according to claim 14; wherein the circuit means comprises an a.c. amplifier for amplifying the photoelectric output signal, and integrating circuit means for integrating the amplified photoelectric output signal and producing an integrated d.c. signal having a negative peak value indicative of the position of the scanning light-shielding member which corresponds to the object distance.

16. A device according to claim 15; wherein the circuit means includes a d.c. amplifier for amplifying the integrated d.c. signal.

17. A device according to claim 15; wherein the detecting means comprises a peak detecting circuit for detecting the negative peak value of the integrated d.c. signal.

18. A device according to claim 15; further comprising a movable control member movable in synchronism with the scanning movement of the light-shielding member such that the position of the control member corresponds to the object distance; and electromagnet control circuit means responsive to the detection output signal for arresting the movement of the control member during the course of the scanning movement of the light-shielding member so that the arrested position of the control member corresponds to the object distance.

19. A device according to claim 14; further comprising a movable control member movable in synchronism with the scanning movement of the light-shielding member such that the position of the control member corresponds to the object distance; and electromagnet control circuit means responsive to the detection output signal for arresting the movement of the control member during the course of the scanning movement of the light-shielding member so that the arrested position of the control member corresponds to the object distance.

20. A device according to claim 14; wherein the detecting means comprises a peak detecting circuit for detecting the negative peak value of the integrated d.c. signal.

* * * * *